April 12, 1927.
C. T. McGILL
1,624,614
TWO-FLOW BASE EXCHANGE WATER SOFTENER
Filed Nov. 14, 1925
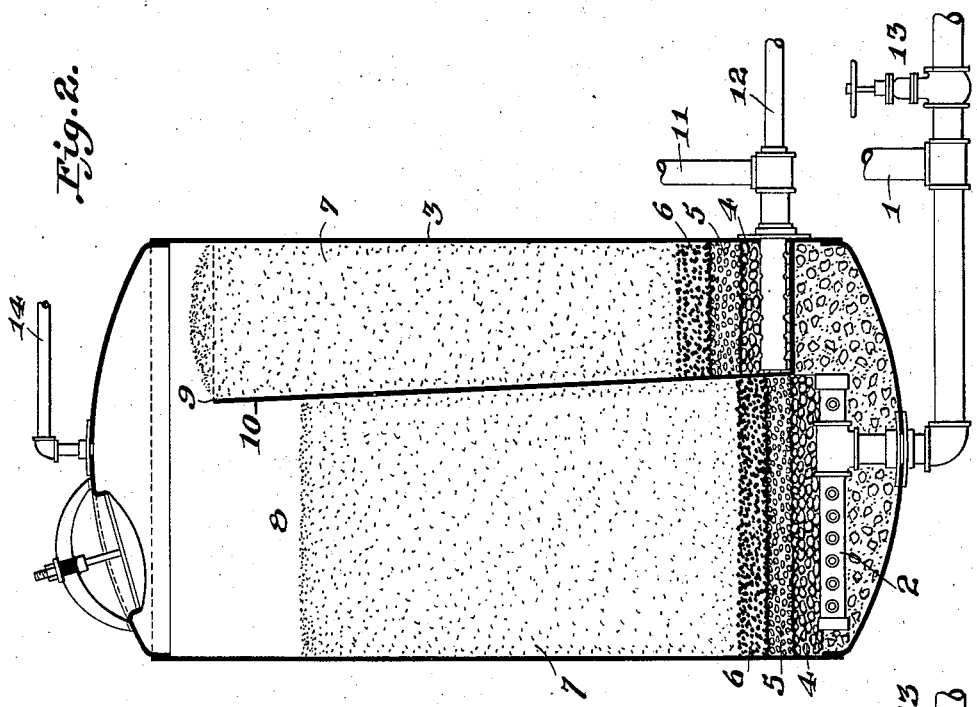
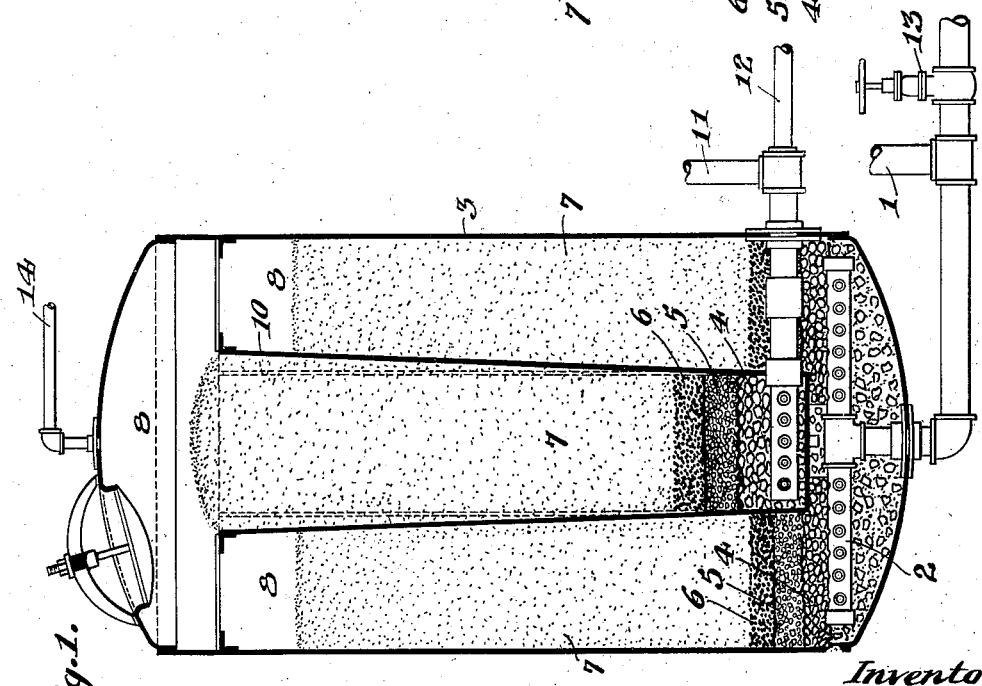
Inventor
Chester T. McGill
By Mason Fenwick & Lawrence
Attorneys Patented Apr. 12, 1927.

1,624,614

UNITED STATES PATENT OFFICE.

CHESTER T. McGILL, OF ELGIN, ILLINOIS, ASSIGNOR TO REITER COMPANY, OF ELGIN, ILLINOIS, A CORPORATION OF ILLINOIS.

TWO-FLOW BASE-EXCHANGE WATER SOFTENER.

Application filed November 14, 1925. Serial No. 69,078.

This invention relates to a base exchange water softener, particularly to improvements whereby a finer base exchange mineral may be used.

An object of this invention is to provide a two-flow softener with means whereby the usual free-board space may be practically eliminated.

A further object is to provide a base exchange softener with means for eliminating the usual waste caused by mineral being carried away with the softened water.

Another object of this invention is to provide means for eliminating or reducing the waste commonly caused by back-washing during regenerating periods between the process of softening.

This invention further provides a construction whereby the usual upflow method, together with the downflow method will be combined thereby filtering the raw water before it comes in contact with the softening base exchange mineral, also filtering the softened water a second time after it has passed through another bed of base exchange material or mineral and before it leaves the softener to the soft water line.

Another object of this invention is to provide a longer flow for the water passing through the mineral thereby increasing the rate of flow per minute of the soft water passing through the softener.

An object is also to provide means for brining or regenerating the mineral whereby the brining is neither put in the bottom of the softener, nor the top of the softener, but at a point between the mineral.

Further objects of this invention will appear in the following detailed description of the device and as disclosed in the single sheet of drawings which is herewith made a part of the application.

In the drawing,

Figure 1 represents a sectional elevational view of a two-flow base exchange water softener.

Figure 2 illustrates a sectional elevational view of a modified form of Figure 1.

Similar numerals in the different figures of the drawings represent identical parts or elements in the water softener.

Numeral 1 designates a pipe through which the raw water enters the softener and flows up through a distributing plate or a system of perforated pipes as at 2, which are adapted to be located near the lower end of the softener tank 3, the plates 2 are arranged to effect an even distribution at all points at the bottom of the softener.

The raw water enters into the gravel bed 4, then into a finer quartz filtering bed 5, thence into a still finer quartz bed or special alundum filtering material molded into fine particles or in crushed form as at 6.

It is apparent that by the time the water passes through these three filtering materials, the suspended material is largely filtered from the water, and the water then passes up through the body of the base exchange mineral 7 and flows up through the free-board space 8, down into a section 9, consisting of an upward extending portion of the downward flow section 10 of the softener, the section 10 being slightly tapered downwardly in order to keep the mineral 7 contained therein from becoming channelled. Obviously, the downwardly tapered sections containing the mineral for the downward flow would necessarily shape the cooperative sections of the softener adapted to contain the mineral for the upward flow into a tapered form adapted to aid in maintaining the mineral free from channels or the like. The water flows up through the free-board space 8 down into the section 9 through the base exchange mineral 7 in the container section 10, and then through the filtering materials 6, 5 and 4 of the same material as adapted for use in the upflow portion of the softener, and thence out into the soft water line 11. The receiving portion of the soft water line 11 which is preferably located at the bottom of the downwardly extending tank 10, is so arranged as to draw the water evenly from all portions of the bottom of the tank 10.

It has been the common practice to use an upflow softener making use of a mineral that runs from 8 to 30 mesh and when using this mineral a free-board space equivalent from 50 to 100% of the space occupied by the mineral is required to reduce the waste of mineral.

Liability of waste is eliminated and a mineral running from 100 to 200 mesh may be used without loss. This adds greatly to the efficiency of the softener for two reasons, one is, that 35% more mineral may be used; the other is, that the finer mineral carries a greater exchange capacity of 66% than the mineral running from 8 to 30 mesh.

The increased amount of mineral used together with the finer mesh of mineral increases capacity of a given size softener, over 100%. Heretofore, this finer mineral has been a waste product and is by certain manufacturers being stored up hoping that it may be used in some softener which would accommodate this finer mineral and this finer mineral can be obtained at a much less cost than the usual coarser mineral from 8 to 30 mesh.

Obviously, the finer mineral will seek its place at the top of the mineral in the upflow portion and in the downward flow section of the softener during regenerating and back washing, the above described finer mineral will be largely lifted and carried from the downflow of the softener into the upward flow portion. It is apparent from the above description, that increased capacities are brought about by using a finer mineral with greater exchange capacities per cubic foot, also, by having a combined up and down flow softener which consumes a greater per cent of the capacity of the exchange mineral or material before it becomes necessary to regenerate, for the following reasons in addition to those given above.

In the common construction of base softeners of the up and down flow type, the mineral coming in contact with the water first, will exhaust itself and the water will register hard in the outlet before the top portion of the mineral is exhausted thereby losing some of the real capacity of the mineral. In the construction described in this invention the loss due to the above causes are greatly cut down, and approximately eliminated. The hardness in the incoming water will be absorbed by the mineral in the lower bed of the mineral 7, and if samples of water were taken from the top of the softener, it would register several degrees of hardness, and if only an upflow softener was used, regenerating would obviously be required. It becomes apparent, however that in the two-flow softener described in this invention, that should the water contain for illustration, 5 to 10 grains of hardness when it reached the top of the two-flow softener, the mineral contained in the downflow portion 10 would absorb the hardness as it passes down through the bed of mineral 7 in the downward tank 10, and the water would pass out soft into the soft water line 11.

By experimentation it has been demonstrated that the exchange capacities of the mineral up to the first 18 or 20 inches from the bottom of the upward flow portion of the softener, would be almost entirely consumed and the exchange capacity of the mineral near the top of the upward flow portion would have considerable exchange capacity left and the water would register hard at the top.

In considering the advantages of this invention, it will be apparent that the water has a much longer travel through the mineral of the upflow portion due to using a portion of the usual free-board space for the base exchange mineral. This, with the additional capacity of the downflow portion, the softener, as herewith described which contains a larger percent of the finer mineral, increases the capacity of the mineral and the additional base exchange space for the water to pass through, removes any remaining hardness that would ordinarily be left in the common type of upflow softener.

In this invention, the brine solution used is added at 12, by means of an ejector or centrifugal pump or salt pot, in which case the finer mineral in downward flow portion 10 is lifted out of the downward flow portion 10 and carried over into the upward flow portion of the softener. This largely leaves only the filtering material in the downward flow portion 10, and as the brine solution flows up through and with the fine base exchange mineral into the free-board space 8 above the upward flow portion of the softener, it becomes thoroughly saturated with the brine solution and the solution is carried down into the coarser mineral as illustrated in the upward flow portion of the softener, and as this salt solution passes through the base exchange mineral, the sulphate and carbonate solids are replaced with sodium salts. Incrusting solids are removed by opening valve at 13. After the salt solution has drained out and the softener has become washed with raw water through a suitable connection to inlet brine pipe 12 leading to the bottom of the downward flow portion 10, and most of the salt solution has been removed, the flow of the hard water is reversed and by admitting the hard water at 1 up through the mineral 7 and free-board space 8, of the upward flow portion of the softener which carries the finer mineral back into the downward flow portion 10 and fills it to the top with the finer base exchange mineral. The softener is again ready for operation as soon as a sample of water taken from 11 tests soft.

In operation, this invention provides a means for brining the base exchange mineral by placing the salt solution into the base exchange mineral at approximately midway, that is, neither at the top nor the bottom of the mineral, but between the mineral and at points between the finer material and the coarser mineral.

This method eliminates any possibility of the finer mineral becoming packed, thereby forming channels and not becoming thoroughly regenerated with the brine solution or becoming soaked with the brine solution, due to being packed in lumps and the brine solution not being thoroughly washed out when backwashed. The fact that the finer mineral is carried from the upflow portion of the softener to the downward flow portion 10 and vice versa during the backwashing and regenerating periods, breaks up any caking and prevents the packing of the mineral.

The numeral 14 designates a surface blow-down pipe and is for the purpose of removing impurities or scum that may pass by the upflow filtering materials 4, 5 and 6, and is finally lodged in the fine base exchange material in the down flow portion 10 or filtering material 6, 5, and 4.

When backwashed with the salt solution, the impurities are washed up into the freeboard space 8, the scum or impurities may be blown out into a sewer or otherwise, by opening a valve on line 14. The downward flow portion 10, may, for convenience, as disclosed in Figure 2 be placed at the side of the tank, or the downward flow portion 10 may be located in other suitable positions within the softener tank 3 as at Figure 1.

The tapering effects given to the upward and downward flow portions of the softener are adapted to facilitate a downward movement of the base exchange mineral along the walled surfaces so as to close up any channels or spaces that otherwise might form in the softening or backwashing of the minerals.

It is to be understood that in this invention, the hard, raw water may be supplied to the softener either through the pipe portions 1 or the pipe portions 11.

What I claim is:

1. A base exchange water softener comprising a tank, an auxiliary container within the tank, multiple layers of filtering material in the tank and in the container, base exchange material supported on the filtering material, means for introducing liquid selectively in the tank and container below the filtering material, the tank and container being in open communication so that the fine loose exchange material may be carried from one bed to the other by the flow of liquid through the apparatus in either direction.

2. A base exchange water softener comprising a tank, an auxiliary container within the tank, multiple layers of filtering material in the tank and in the container, base exchange material supported on the filtering material, means for introducing liquid selectively in the tank and container below the filtering material, the tank and container being in open communication so that the fine loose exchange material may be carried from one bed to the other by the flow of liquid through the apparatus in either direction, the container having a downwardly tapered portion for the purpose of preventing channelling during downward flow of water through the container.

In testimony whereof I affix my signature.

CHESTER T. McGILL.